United States Patent
Beaujean

(10) Patent No.: US 6,540,440 B1
(45) Date of Patent: Apr. 1, 2003

(54) METHOD AND MEANS FOR STORING AND/OR TRANSPORTING AN ELONGATED TUBE OR CABLE

(75) Inventor: Joseph Marie Elise Beaujean, Venlo (NL)

(73) Assignee: Bogey Venlo B.V., Venlo (NL)

( * ) Notice: Subject to any disclaimer, the term of this patent is extended or adjusted under 35 U.S.C. 154(b) by 0 days.

(21) Appl. No.: 09/763,202

(22) PCT Filed: Aug. 17, 1999

(86) PCT No.: PCT/NL99/00521
§ 371 (c)(1),
(2), (4) Date: Apr. 23, 2001

(87) PCT Pub. No.: WO00/11388
PCT Pub. Date: Mar. 2, 2000

(30) Foreign Application Priority Data

Aug. 20, 1998 (EP) .............................................. 98202804

(51) Int. Cl.[7] .................................................. F16L 1/20
(52) U.S. Cl. ................. 405/168.1; 405/171; 405/168.3
(58) Field of Search .......................... 405/168.3, 168.4, 405/168.1, 168.2, 169, 170, 171, 158

(56) References Cited

U.S. PATENT DOCUMENTS

| | | | | |
|---|---|---|---|---|
| 3,237,438 A | * | 3/1966 | Tesson | 405/168.3 |
| 3,512,367 A | * | 5/1970 | McLallen, Jr. | 405/168.3 |
| 3,698,348 A | * | 10/1972 | Morgan | 114/245 |
| 3,855,835 A | * | 12/1974 | Tisdale et al. | 405/166 |
| 3,965,713 A | * | 6/1976 | Horton | 242/159 |
| 4,089,178 A | * | 5/1978 | Kinase et al. | 405/66 |
| 4,117,692 A | * | 10/1978 | Oberg | 405/158 |
| 4,260,288 A | * | 4/1981 | Ellers et al. | 405/158 |
| 4,659,253 A | * | 4/1987 | Jacobson | 405/158 |
| 4,739,800 A | * | 4/1988 | Baratella | 405/171 |
| 4,798,500 A | * | 1/1989 | Morton | 405/158 |
| 5,575,590 A | * | 11/1996 | Drost et al. | 405/166 |
| 6,089,489 A | * | 7/2000 | Cruickshank | 405/168.3 |

FOREIGN PATENT DOCUMENTS

WO 97/41054 * 11/1997

* cited by examiner

Primary Examiner—Frederick L. Lagman
(74) Attorney, Agent, or Firm—Young & Thompson

(57) ABSTRACT

Method for preparing an elongated object (22) having a relatively high bending stiffness, such as an elongated tube or cable, before storing and/or transporting object, wherein a) the elongated object is provided with sufficient buoyancy capacity to enable the object to float on a liquid (14) with a predetermined specific gravity and that b) the elongated object (22), while floating on the liquid and carried thereby, is spirally wound into a flat monolayer spiral (36), the inner radius of which is preferably in the order of the diameter of the elongated body divided by the yield point (ratio) or larger of the most fracture critical material in the elongated object.

11 Claims, 6 Drawing Sheets

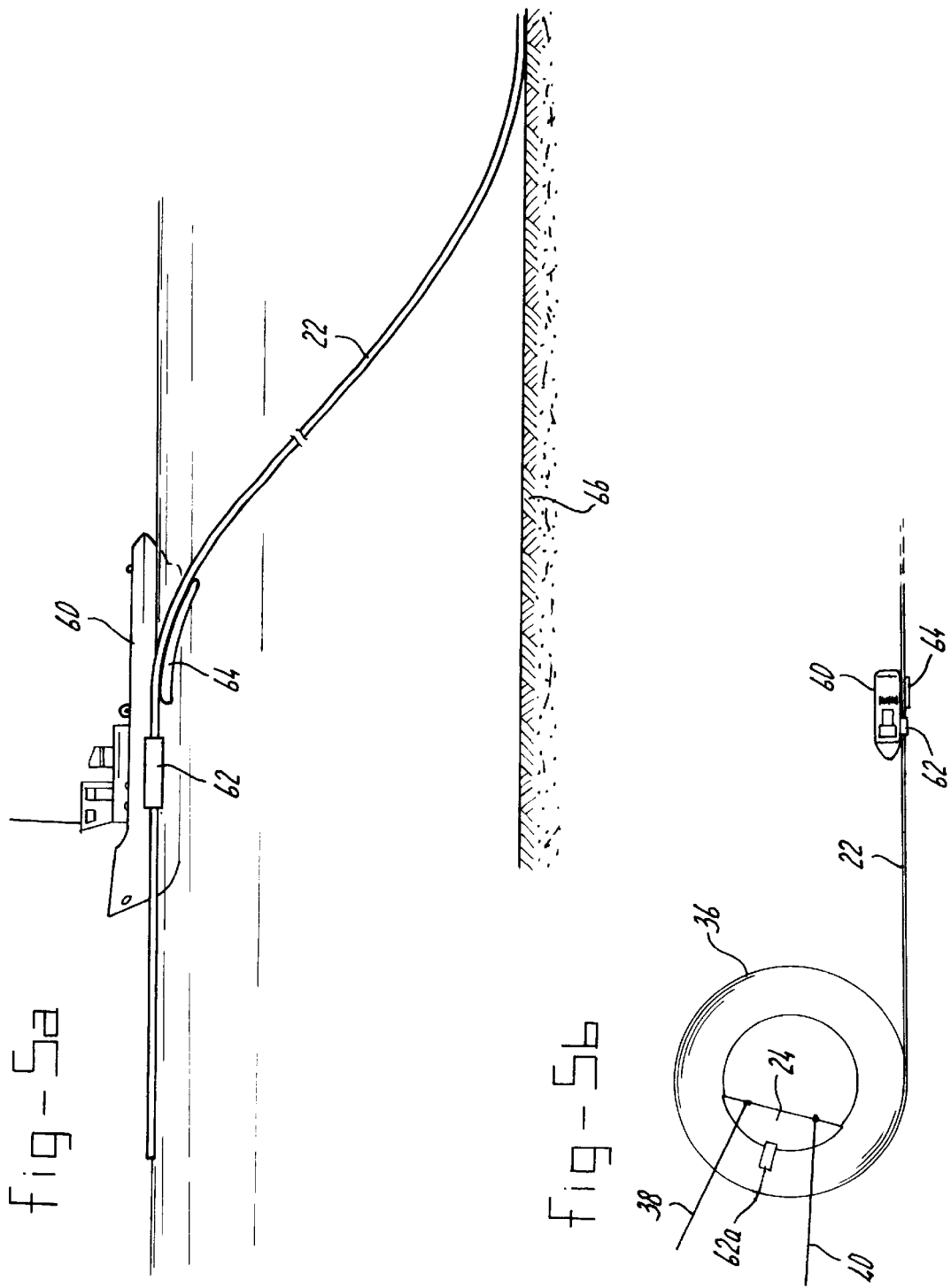

METHOD AND MEANS FOR STORING AND/OR TRANSPORTING AN ELONGATED TUBE OR CABLE

The invention relates to a method and means for preparing an elongated object having a relatively high bending stiffness, such as an elongated tube or cable, before and while sorting and/or transporting said object.

For laying pipelines on the sea bed one could use the option whereby short pipe sections are transported to a special pipe laying vessel, which travels along the traject where the pipe has be laid. On that vessel the pipe segments are welded together and the resulting long pipeline is lowered into the sea. This method and the vessels to perform this method are widely known. The operation of these specialized vessel is rather slow so that the chance of meeting bad weather, rough seas and other non favourable conditions is not imaginary.

Another option is to weld the pipe segments together into a pipeline on the shore, to drag the line into the water after providing sufficient buoyancy to the line to keep the line afloat and to use one or more tugboats to transport the floating line to its destination where a specially equipped pipe laying vessel is used for lowering the pipeline onto the seabed. Although the pipe laying vessel could operate significant faster in this case because all the welding is already done, this option is only feasible for restricted length of pipelines, e.g. a few hundred meters. Longer pipelines result into serious navigational problems and pipe line lengths of e.g. 100 km are definitely out of the question. Examples of methods which fall into this category are described in U.S. Pat. No. 4,798,500 and U.S. Pat. No. 3,698,348.

For transporting long pipelines one has already proposed to use large reels onto which the pipeline is wound. The reel with the thereon wound pipeline should have sufficient buoyancy to keep the combination afloat. Indeed relatively long pipelines having a length of many km can be transported in this way using one or more tugboats to the position where the pipe laying vessel is waiting to lower the pipeline onto the sea bottom. A prior art example of this option is found in U.S. Pat. No. 4,117,692.

Instead of floating reels it is also known to use special pipe laying vessels which are able to transport the reel whereby the reel is supported on a horizontal axis. An example is described in U.S. Pat. No. 4,802,794. At its destination the reel is brought into a rotating motion around said axis and the pipeline is unwound and lowered down.

A serious disadvantage is formed by the reel itself. Reels of large dimensions are very expensive especially if they have to carry large weights in the order of for instance 35,000 tons or even more as in the case of long pipelines. Even if such relatively large reels are used still they are only practicable for tubes with a restricted cross-section and a relatively large flexibility. If a reel is used with a diameter of e.g. 10 m and a width of 4 m for storing a pipeline width a diameter of 20 cm then still a monolayer winding will only hold approximately 600 m length of pipeline. In more layers it would be possible to store a pipeline with a length of a few km on such a reel.

Such loaded reels become hard to handle especially installed on a horizontal shaft onboard of a ship, on the one hand because of the dimensions and on the other hand because of the weight thereof. If longer lines are wound in more than one layer on a reel a further disadvantage is the transition between the various layers. Deformation of the tube at said transition is hardly avoidable.

The object of the invention is now to provide a method for sorting and/or transporting a pipeline, which method can be used with very long pipelines of relatively large diameter.

In agreement with said object the invention provides a method for preparing an elongated object having a relatively high bending stiffness, such as an elongated tube or cable, before storing and/or transporting said object, which method is characterised in that
 a) the elongated object is provided with sufficient buoyancy capacity to enable the object to float on a liquid with a predetermined specific gravity and the
 b) the elongated object, while floating on the liquid and carried thereby, is spirally wound into a flat monolayer spiral, the inner radius of which is preferably in the order of the diameter of the elongated body divided by the yield point (ratio) or larger of the most fracture critical material in the elongated object (e.g. concrete liner or jacket).

The method according to the invention does not use a reel. The pipeline itself has its own buoyancy and floats on the liquid. It might be surprising but even large diameter tubes which are rather stiff (e.g. tubes with a concrete jacket to provide sufficient weight to maintain the pipe on the sea bottom) can be bend into a circle with a diameter of a few hundred meters without damaging the tube. The bending operation can be performed with relatively small bending forces and with relatively simple means as will be discussed later.

As soon as the pipeline is prepared for transport in this manner it is possible to test the quality of the pipeline by closing both ends of, pressurizing the closed tube and inspecting the tube with apparatuses known as such. If the pipeline fulfills the requirements the transporting operation can be started.

To avoid that the pipe sections of which the pipeline is assembled have to be welded together in a wet environment while the segments are floating it is preferred that before performing step a) or during the performance of step a) the elongated body is assembled from smaller sections on a solid surface. This solid surface may be a land surface near the shore of a lake, sea, ocean etc. The pipe is welded together on the shore, buoyancy elements are attached and the pipe is drawn into the lake or sea. In stead thereof said solid surface may be the deck of a ship, pontoon or other floating vessel where the pipe is welded together on deck, buoyancy elements are attached and the pipe is drawn into the lake or sea. It is rather obvious that in the abovementioned cases the liquid will be (sea)water. However, also other liquids can be used.

It will be clear from this embodiment that application of the invention is not confined to large stretches of water, but can be brought into practice on land as well. The advantage with reference to the pending situation is that handling a floating spirally shaped tube is for more easier than disassembling and assembling a whole pipe string each time for instance the drill bits have to be replaced.

Although the gutter may be filled with water in the direct neighbourhood of a drilling rig site there are large volumes of drilling fluid which have to be stored in reservoirs, tanks etc. Within the scope of the invention it is now proposed to store the drilling fluid in a gutter so that the liquid, onto which the pipeline floats, consists of drilling fluid.

The elongated object can be provided with at least a part of the necessary buoyancy by closing both ends of the pipeline and filling the pipeline with a substance of which the specific gravity is lower than the specific gravity of (sea)water. This substance could be a gas, preferably air. An advantage of this option is that a simple pressure meter measuring the pressure inside the pipeline is sufficient to provide an indication of the air-tightness of the pipeline during storage and transport thereof.

Furthermore, the elongated object can be provided with sufficient buoyancy capacity by attaching a number of buoyancy bodies to the spirally wound pipeline, preferably in an approximately equiangular configuration, or by attaching a coating of a material with low specific weight to the outside wall of the pipeline.

To create and maintain the shape of the spiral configuration of the pipeline during winding, during transport and during unwinding and to prevent therewith a to strong deformation from the desired shape a guiding means is used which comprises a body with a bow shaped side wall, the shape of which corresponds with the desired shape of the inner winding of the spirally wound pipeline.

During winding and unwinding operations preferably measures are taken to assure a low friction movement of the pipeline along said side wall. However, during transport said body is attached to the inner winding of the spiral such that the centre of said body is positioned on a line through the center of the spiral in the direction of transport or in the prevailing direction of the combined forces exerted by wind and/or water flows.

It is remarked that a tube wounded into a flat monolayer spiral is used also in WO 97/41054. However, in that case the spiral has no buoyancy and is carried by waggons running on a circular stretch of railway. From the wagons the tube is transferred to the installations on board a pipe laying vessel.

Further detail of the method as well as details of the means which are preferably used when the method is performed, are provided in the following specification part with reference to the accompanying drawings.

The invention will be explained in more detail with reference to the attached drawings.

FIG. 5 illustrates how the spiral can be unwound and the pipeline can be laid onto the sea-bottom.

Figure 1:
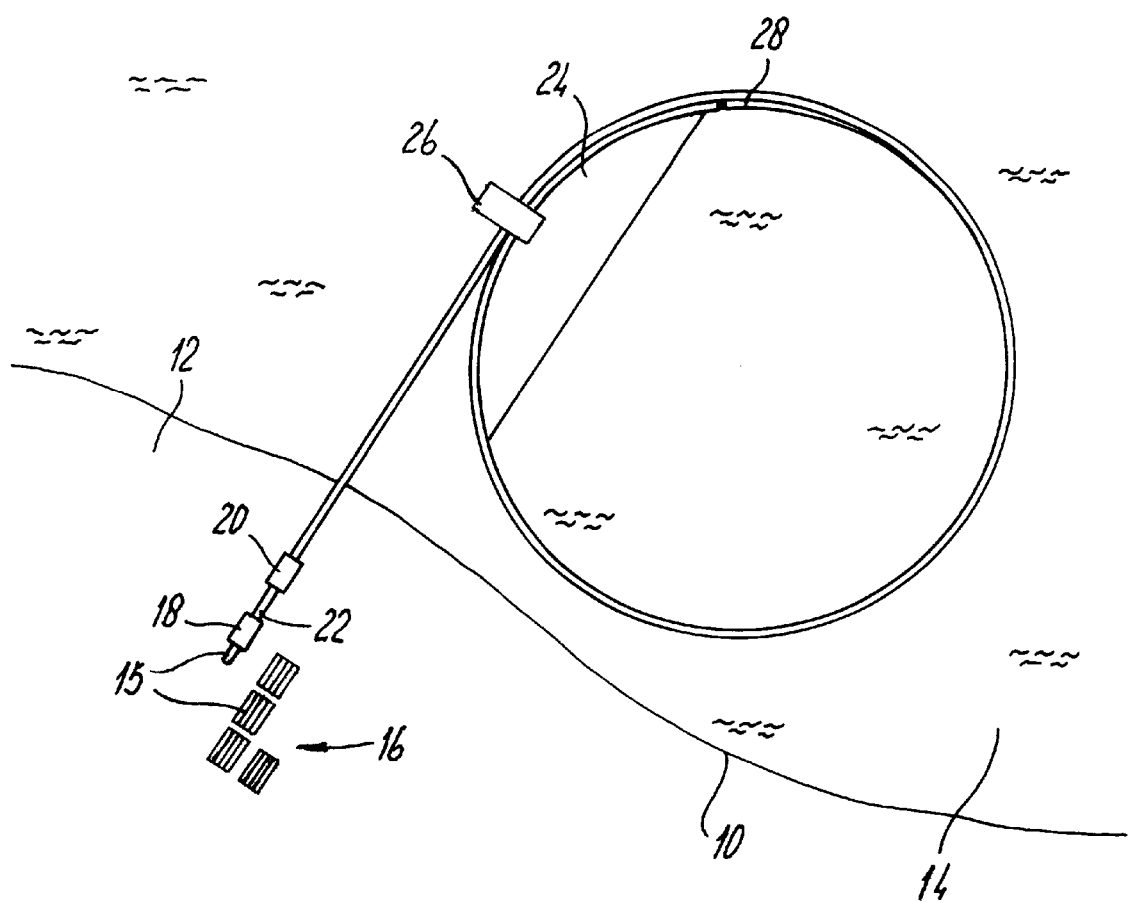
FIG. 1 illustrates a first embodiment of the method according to the invention whereby a long pipeline is assembled on land and thereafter moved to the sea where the pipeline is wound into a spirally shaped monolayer coil.

FIG. 1 illustrates a helicopter view on a site for assembling an elongated pipeline and for winding the pipeline into a monolayer spiral configuration. The shore line is indicated by 10. Beneath the shore line 10 is a land surface 12 and above the shore line 10 is the sea or lake 14. The pipe segments 15 from which the pipeline has to be assembled are stored in a storage area 16. A welding station is indicated by 18 and a jacketing station is indicated by 20.

One by one the pipe segments 15 are transferred from the storage area 16 into the welding station 18, such that one end of the pipe segment is positioned adjacent the momentaneous end of the pipeline 22. In the welding station 18 the new pipe segment is welded to the pipeline. After inspection of the weld the whole pipeline 22 is moved in the direction of the sea 14 over a sufficient distance to enable a further pipe segment 15 to become welded to the momentaneous end of the pipeline etc. During the passage over land the pipeline may be supported if necessary by stationary rollers, by lorries running on rails or by other means, known as such.

During this transport in the direction of the sea 14 the pipeline 22 passes a second operating station 20 wherein a coating of high buoyancy material is attached to the pipe wall. The thickness of this coating is selected such that the upward force supplied by the buoyant coating more than balances the downwards force as a result of the pipelines own weight.

After attaching the foam jacket the pipeline 22 crosses the shore and becomes floating on the sea water 14. The front end of the pipeline is received by a guiding unit 24 carrying drive rollers 26, which unit by means of anchor lines or other suitable means is maintained at a fixed position. The drive rollers are positioned one above and one underneath the pipeline in contact with the pipeline. By rotating the roller suing suitable driving means the pipeline 22 is brought into motion. Details of this guiding means 24 and rollers 26 will be provided with reference to FIGS. 6A, 6B and 7.

As a sufficient length (e.g. a few hundred meters) of the pipeline has passed the drive rollers 26 on the guiding means 24, a cable is attached to the end of the pipeline and to a tug boat and the tug boat starts pulling the end of the pipeline sidewards to create a bow shape. As soon as a suitable bow shape is obtained the end of the cable is fixed to the appropriate side of the guiding means 24 whereafter it appears to be rather simple to form a complete circle just by pulling at the cable.

In FIG. 1 the situation is illustrated where the complete circle is formed and whereby already a part of the second winding has been formed.

Each time a pipe segment 15 is welded to the end of the pipeline in the welding station 18 the rollers 26 on the guiding means 24 (together with other guiding means if necessary) are activated to move the pipeline towards the sea and to turn the spiraled pipeline on the sea over a sufficient distance to obtain a situation wherein next pipe segment 15 can be welded to the end of the pipeline in the welding station 18.

To avoid or at least restrict deformation of the spiral shape, which could lead to local overstress causing damage to the pipeline, the guiding means 24 are used guiding the pipeline along at least a part of its circular route. In practice it appeared to be sufficient for the guiding surface of the guiding means 24 to extend over approximately a 90° sector of a circle.

Without specific measures there is a fair chance that during the rotation of the spiral the leading end of the pipeline will become stuck against the edge of the guiding means 24. To avoid that it is preferred to use a wedge shaped element 28, one end of which is positioned near the leading end of the pipeline and shaped correspondingly. The element 28 has a rounded side following the inner winding of the spiraled pipeline and the width of the element 28 is gradually becoming smaller with growing distance from the leading pipe end. Further details of this wedge shaped element 28 will be provided with reference to FIG. 8.

In this manner a very long pipeline can be sound into a spiral configuration with surprisingly small dimensions. Take for example a pipe with a diameter of 24 inch (approximately 61 cm) and a length of 100 km. If such a pipeline is wound up, taking into account the flexibility limits of the pipe line, then in a practical example a spiral with an inner diameter of 250 meter and approximately 200 windings will be obtained. The outer diameter is approximately 380 meter and the whole configuration comprises about 35,000 tons of steel.

By closing both ends of the pipeline it is rather easy to test the whole pipe on leakage by pressurizing the inner volume of the tube and by measuring any pressure drop over a predetermined time period.

By closing both ends of the tube and by pressurizing the tube furthermore the whole configuration obtains additional buoyancy. With thin walled pipes this buoyancy is often already sufficient to keep the whole configuration floating so that the addition of a foam jacket is superfluous.

It will be clear that during the winding operation suitable fastening means can be used to secure the pipe in the obtained spiral shape. These fastening means are considered known the therefor details thereof will not be provided.

In stead of performing the welding and jacketing operation on land it is within the scope of the invention conceivable to perform these operations on board of ship, a pontoon etc. An advantage thereof is the rather easy transport of the whole installation to a suitable location near the position where the pipe laying operation will start. The spiral produced at said location has to be transported only over a relatively small distance to said position where the pipe laying operation will start. A further advantage is the relatively easy movement of the pipe from the deck of the vessel to the sea surface. On the other hand the delivery and storage of the pipe segments may meet more problems. A helicopter view on a site where this embodiment is brought into practice is shown in FIG. 2.

Figure 2:
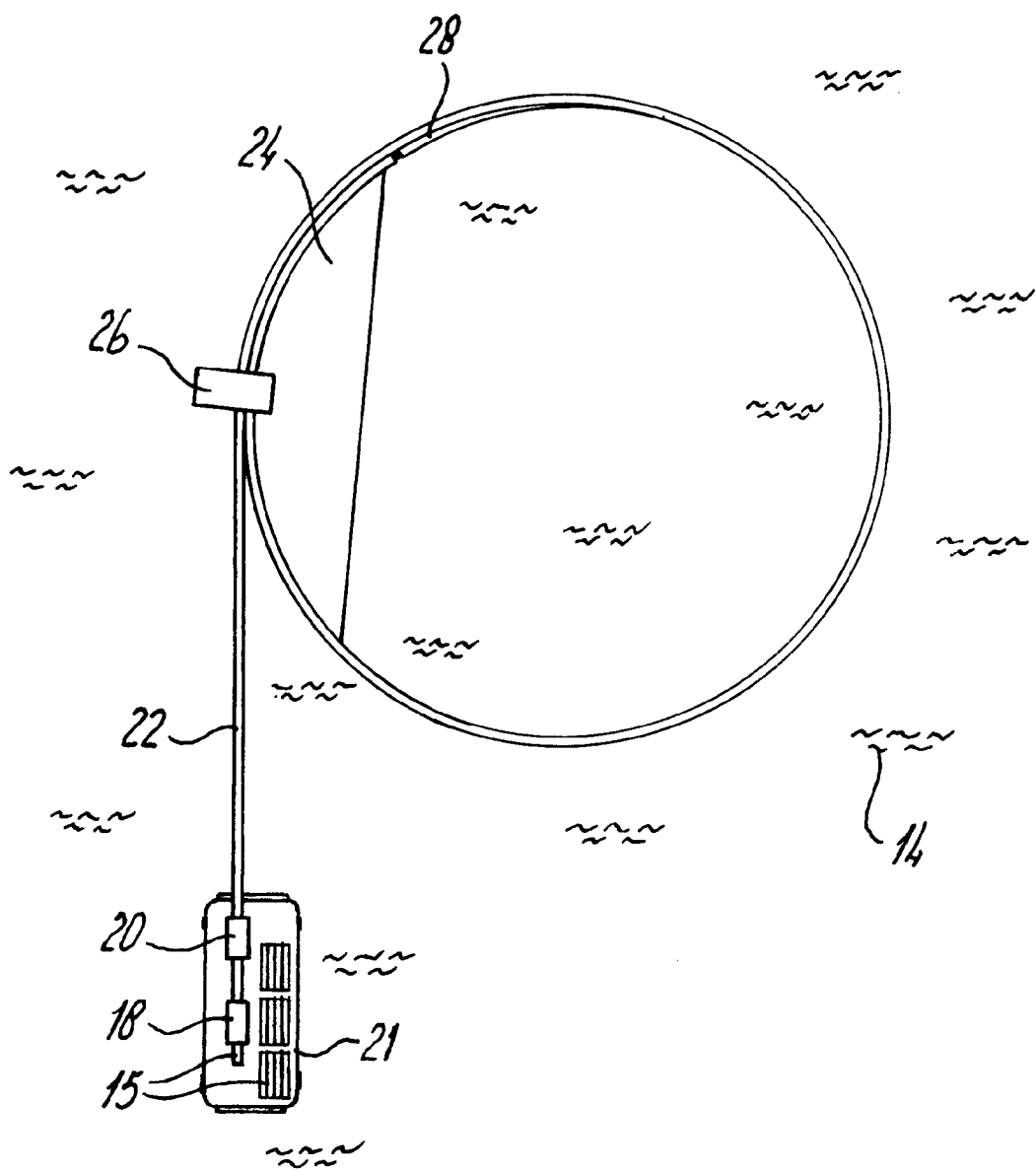
FIG. 2 illustrates an alternative embodiment of the method according to the invention whereby both the assembly operations as well as the winding operations are performed on a water surface (such as a sea or lake).

The welding station 18 and the jacketing station 20 are in the embodiment of FIG. 2 installed on board of a vessel 21. It is assumed that the pipe segments 15 are stored somewhere in or on the vessel 21. In the same manner as explained with reference to FIG. 1 the pipe segments are transported one by one to the welding station where they are welded to the end of the pipeline 22. In station 20 a foam jacket is attached to the wall of the pipeline and thereafter the pipeline slides into the sea where the pipeline is wound into the spirally shaped configuration in the manner described above with reference to FIG. 1.

Figure 3:
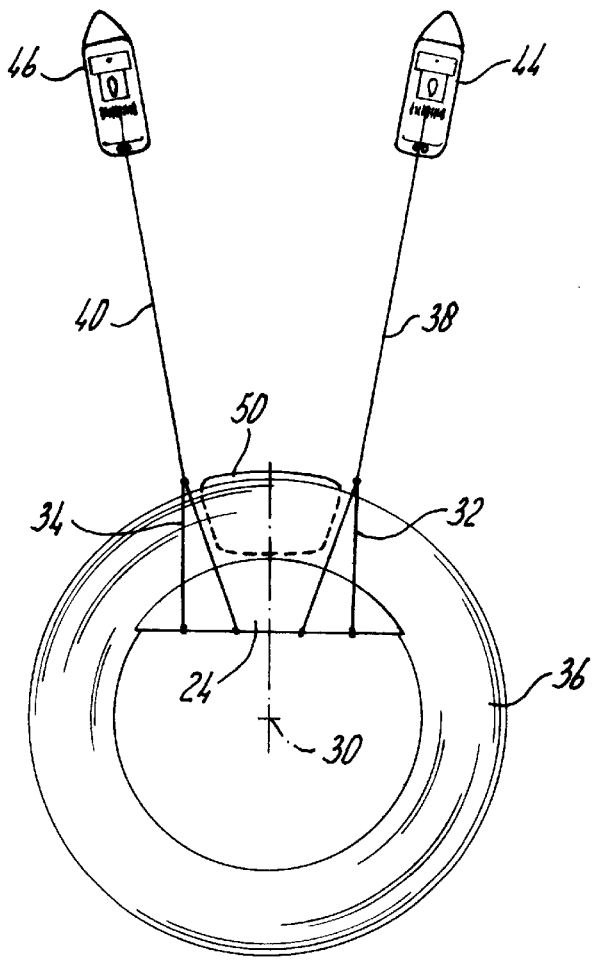
FIG. 3 illustrates schematically the transportation of the spiral across the sea using a number of tugboats.

After completing the winding operation the roller means are not necessary anymore. It is however preferred to let the guiding means 24 in place to maintain the tube in shape during transport and to avoid deformation of the spiral caused by the towing force of the tugboats. As is shown schematically in FIG. 3, the spiral 36 is made ready for transport by putting a number of straps 32 and 34 around the spiral 36 and connecting these straps 32 and 34 by means of towing cables 38 and 40 to a corresponding number of tug boats 44 and 46 as is schematically illustrated in FIG. 3. In general more than one tug boat will be necessary to obtain sufficient navigational stability.

As already indicated it is preferred to leave at least the shaped body 24 of the guiding unit (or a corresponding element) in place to maintain the circular shape during transport. If the spiral has insufficient stiffness the circular shape may deform into an oval under the influence of the towing forces whereby relatively large bending forces will appear especially at both ends of the oval shape. To avoid that, preferably the bow shaped element 24 is installed at a position wherein an imaginary line 48 through the centre 30 of the spiral 36 in forwards transportation direction extends right through the centre of the element 24.

During transport any rotational movement of the spiral has to be avoided. In that respect it is preferred that during transport there is a large friction between the guiding means 24 and the spiral 36. One could use a layer of high friction material between the guiding means 24 and the spiral 36. Other measures to enlarge the friction between the guiding means 24 and the spiral 36 will be discussed with reference to FIGS. 6A, 6B and 7.

Figure 4:
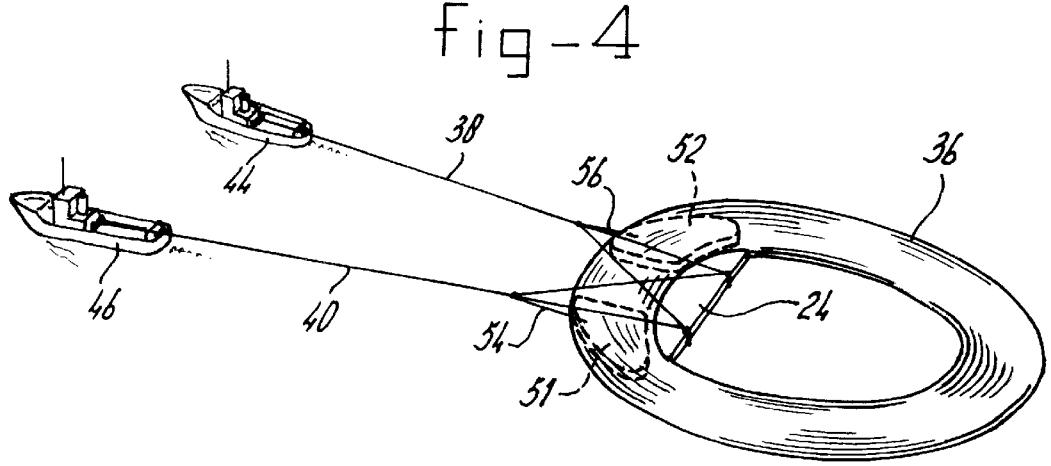
FIG. 4 illustrates the use of an additional floating body at the "bow" of the spiral during transport.

To improve the maneuverability and to decrease the resistance offered by the spiral it is preferred to bring a floating shaped body 50 underneath the front side of the spiral 36 as is schematically illustrated in FIG. 4. Preferably this floating body is shaped as the bow of a ship. In one very practical embodiment the floating body is made of a flexible material and is inflatable to ease the handling thereof such as a standard rubber dinghy but on a larger scale. Preferably the bow of the floating body 50 is connected by lines to the tow lines 40 and 38 (or directly to the two tug boats 44 and 46) to maintain the floating body at its desired position in relation to the spiral 36.

Instead of one floating body also two floating bodies 51 and 52 can be used as is illustrated schematically in FIG. 4. The front sections of the two floating bodies 51 and 52 are through suitable lines 54 and 56 connected to the two lines 40 and 38 (or directly to the two tug boats 44 and 46).

Figure 6A:
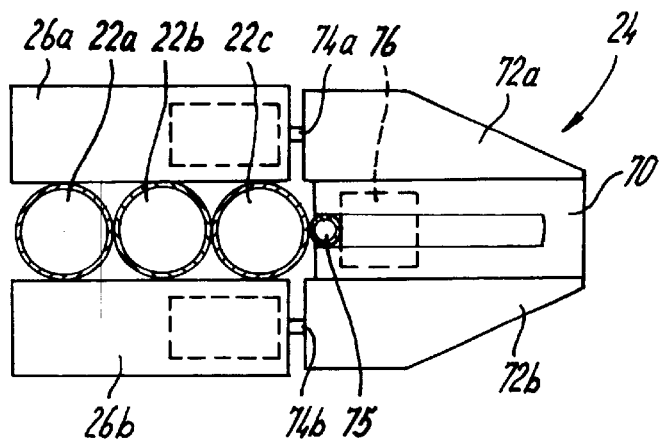
FIGS. 6A and 6B illustrate details of the guiding unit used preferably during the winding and unwinding operations.

As at the end of the transportation operation the position is reached where the spiral has to be unwound and the pipe has to be lowered on the sea bottom means are needed to remove the jacket and to apply a braking force to the pipeline such that the pipeline is lowered under controlled conditions with an acceptable speed. As illustrated in the cross sectional view of FIG. 5A and the helicopter view of FIG. 5B a vessel 60 is used which has a dejacketing station 62 and a stinger 64. To control the unwinding procedure first of all a similar (or the same) guiding unit 24 as employed during the winding operation is attached to the proper side of the spiral. In FIG. 6A only the rollers 26A and 26B are visible because the main body of the unit 24 is inside the spiral. The guiding unit 24 is maintained at its desired position e.g. by means of tug boats which are not illustrated in the figures. Driven by the rollers 26A and 26B of this guiding unit 24 the pipeline 22 is unwound and transported through the dejacketing station 62. To obtain a smooth transport route the dejacketing station is preferably installed alongside the vessel at water level. From there the pipeline is guided along a stinger 64 alongside the vessel and is lowered onto the sea bottom 66. During this operation brake means are used to obtain a controlled movement of the pipeline. Various embodiments of brake means are already known from the prior art, e.g. from U.S. Pat. No. 5,575,590 and GB-947196.

It is preferred especially for deeper water operations that the during the lowering operation the pipe is filled with pressurised gas to provide the pipe with a certain stiffness and to counteract the tendency to buckle or to implode. Pressurizing the pipe can be done rather easy with simple means.

It is remarked that the dejacketing station can be eliminated in case a foam is used which will collapse at increased outside pressure. In that case the cells of the foam structure will implode under the influence of the hydrostatic pressure during the downwards movement somewhere between the water level and the sea bottom. The buoyancy disappears and the pipeline comes to rest on the sea bottom.

Figure 6B:
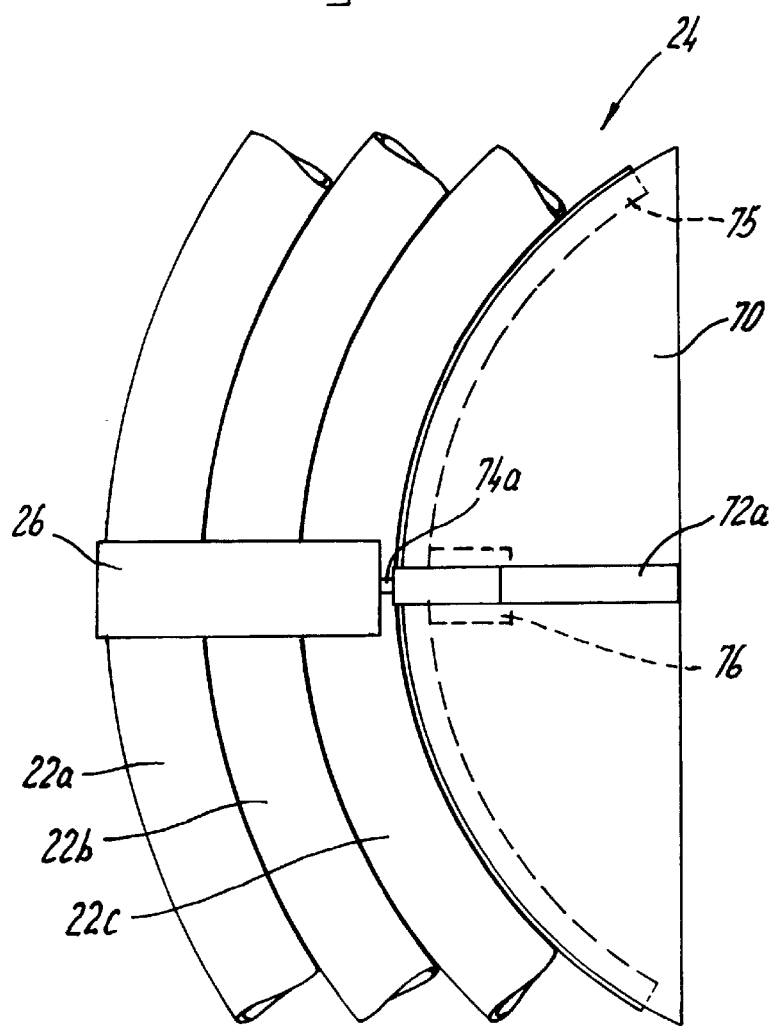

FIGS. 6A and 6B provide more details of the guiding unit 24. The unit 24 comprises a main body 70 which is preferably a hollow body providing enough buoyancy to keep the unit afloat. On both sides of this body 70 carriers 72A and 72B are installed each carrying through an axle 74A and 74B the respective rollers 26A and 26B. The means for driving the rollers 26A and 26B can be installed for instance inside the hollow rollers. Preferably suitable tensioning means are present to bias the rollers slightly towards each other so that a firm contact between the rollers 26A, 26B and the pipe windings 22A, 22B, and 22C is assured. The side wall of the hollow body 70 which is directed to the inner winding 22C of the spiral carries at its inside surface a pipe 75 connected to a pump 76. A series of holes is made through the wall of the pipe 75 and the adjacent wall of the hollow body such, that water may flow from the pipe 75 through said holes in the direction of the inner winding 22C. This flowing water is pressurized by the pump 76. The pump has sufficient power to create a strong water flow. In this matter a water bearing is obtained which enables a smooth and low friction guidance of the pipeline along said side wall surface.

As remarked above during transport it is preferred that there is a high friction between the spiral and the guiding unit. To obtain large friction in the embodiment of FIGS. 6A and 6B the pump 76 is switched off.

Figure 7:
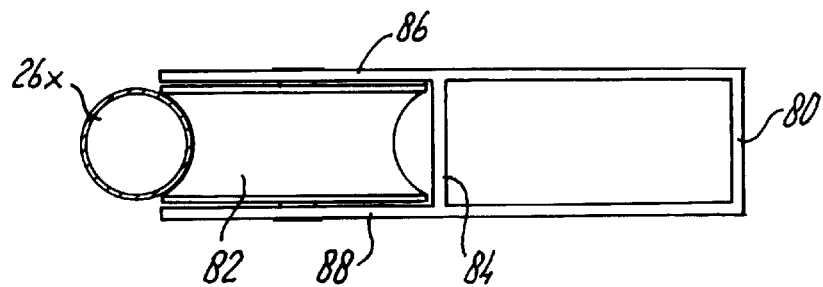
FIG. 7 illustrates an alternative embodiment of the guiding means.

In FIG. 7 a cross section through another embodiment of the guiding unit 80 is illustrated. In this embodiment the side wall 84 is set back in relation to the upper and lower wall 86 and 88 and in the resulting free space a number of wheels 82 are installed. These wheels 82 are mounted on vertical axes. It will be clear that the pipeline 22 will be guided smoothly and with low friction by the series of wheels 82.

A high friction configuration, as preferred during transport, can be obtained be blocking all the wheels 26x against rotation.

Figure 8A:
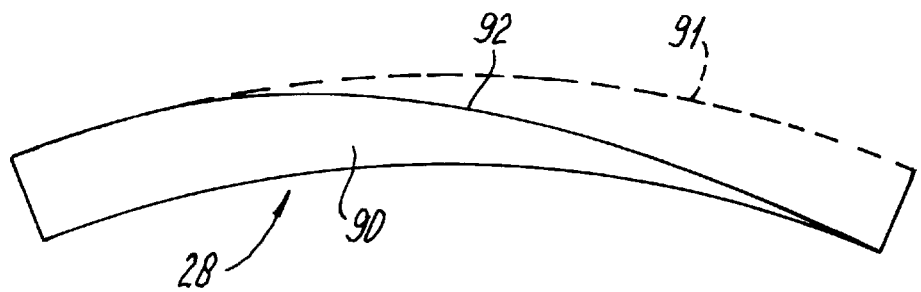
FIG. 8 illustrates details of the shaped wedge used preferably during winding and unwinding operations.

FIG. 8A illustrates the way in which the wedge shaped element 28, shown in FIGS. 1 and 2 assure a smooth rotating motion of the inner spiral winding around the guiding element 24 can be obtained. A pipe segment 91 of the required length is taken and bended with a radius which equals the radius of the beginning of the inner winding 22C. Thereafter a section of this pipe segment, especially the part above the line 92 in FIG. 8A, is removed. The remaining shaped element has at its left hand side in FIG. 8A still the circular closed shape, but at its right end side the original circular closed shape is reduced into a pointed end shape. Between both ends there is a gradual transition such that the line 92 in fact fits closely to the pipeline at the transition between the fist and second windings of the spiral.

Figure 8B:
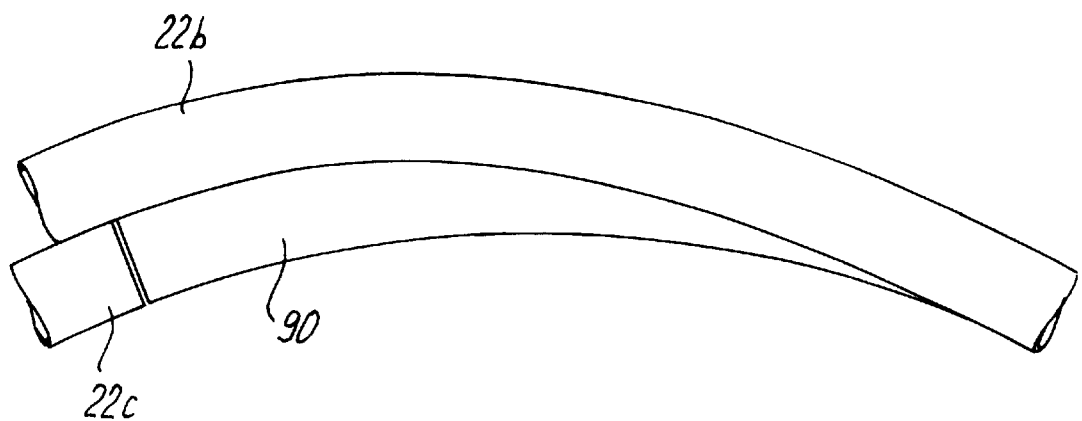

FIG. 8B illustrates the obtained shaped element 28 in its operational position in line with the beginning of the first winding 22C and lying closely against the end of the first winding, there where the first winding passes into the second winding 22B. Apart from streamlining the inner winding the wedge 28 can be used as means for pressure tight closing the end of the pipeline.

What is claimed is:

1. Method for preparing an elongated object having a relatively high bending stiffness, such as an elongated tube or cable, before storing and/or transporting said object, characterized in that
   a) the elongated object is provided with sufficient buoyancy capacity to enable the object to float on a liquid with a predetermined specific gravity and that
   b) the elongated object, while floating on the liquid and carried thereby, is spirally wound into a flat monolayer spiral, the inner radius of which is sufficiently large to avoid fracturing the most fracture critical material in the elongated object.

2. Method according to claim 1, characterised in that the liquid consists of drilling fluid.

3. Method according to claim 1, characterized in that the elongated object is provided with at least a part of the necessary buoyancy by closing both ends of the pipeline and filling the pipeline with a substance of which the specific gravity is lower than the specific gravity of said liquid.

4. Method according to claim 1, characterised in that during step b) a guiding means is used which comprises roller means rotatable around horizontal axes one above and one underneath at least the inner winding of the spiral and acting on said winding to bring the spiral in rotation around its centre.

5. Method according to claim 4 characterised in that in case the guiding means furthermore comprise a body with a bow shaped side wall, the shape of which corresponds with the desired shape of the inner winding of the spirally wound pipeline.

6. Method according to claim 1, characterised in that during transport of the floating spirally wound pipeline an additional floating body is installed under the forwards directed section of the spiral, which floating body provides a streamline to the configuration.

7. Method according to claim 1, characterised in that during transport of the floating spirally wound pipeline a guiding means is used which comprises a body with a bow shaped side wall, the shape of which corresponds with the desired shape of the inner winding of the spirally wound pipeline said body being attached to the inner winding of the spiral such that the centre of said body is positioned on a line through the centre of the spiral in the direction of transport.

8. Method according to claim 1, and transporting said floating spirally wound pipeline by moving it horizontally relative to said liquid while floating on the liquid.

9. Guiding means for use in the method according to claim 4, characterised in that the guiding means comprise a body with a bow shaped side wall, the shape of which corresponds with the desired shape of the inner winding of the spirally wound pipeline, whereby a number of water jets are installed in said bow shaped wall, each connected through suitable conduits to a water pump, to create during operation a water bearing between said wall and the inner winding of the spirally wound pipeline.

10. Guiding means for use in the method according to claim 4, characterised in that the guiding means comprise a body with a series of wheels arranged such that the wheels determined a bow shaped guiding path the shape of which corresponds with the desired shape of the inner winding of the spirally wound pipeline.

11. Guiding means according to claim 10, characterized in that the outer surface of said wheels, coming into contact with the pipeline, is concave in agreement with the shape of the pipeline such that the pipeline closely fits into said concave surface.

* * * * *